United States Patent [19]

Onoue

[11] Patent Number: 4,884,470
[45] Date of Patent: Dec. 5, 1989

[54] POWER TRANSMISSION APPARATUS

[75] Inventor: Toshinobu Onoue, Tochigi, Japan

[73] Assignee: Tochigifujisangyo Kabushiki Kaisha, Tochigi, Japan

[21] Appl. No.: 283,799

[22] Filed: Dec. 13, 1988

[30] Foreign Application Priority Data

Dec. 15, 1987 [JP] Japan .................... 62-189493[U]

[51] Int. Cl.$^4$ .............................................. F16H 1/44
[52] U.S. Cl. ................................................... 74/710.5
[58] Field of Search ............................... 74/711, 710.5

[56] References Cited

U.S. PATENT DOCUMENTS 3,869,940 3/1975 Webb et al. ........................ 74/711
4,058,027 11/1977 Webb ................................. 74/711
4,718,300 1/1988 Magg ............................. 74/711 X Primary Examiner—Dirk Wright
Attorney, Agent, or Firm—Samuels, Gauthier, Stevens & Kehoe

[57] ABSTRACT

In a power transmission apparatus of viscous coupling type, when two first and second output shafts are kept rotated at two big different speeds for many hours as when the ordinary tire is replaced with a spare tire, temperature and pressure within viscous fluid rise abnormally high. In this case, viscous coupling limit slip differential mode is switched to a free differential mode by means of a movable clutch shaft. Further, it is also preferable to directly couple the first and second output shafts to obtain a differential lock mode when the vehicle is travelling on muddy road.

5 Claims, 4 Drawing Sheets

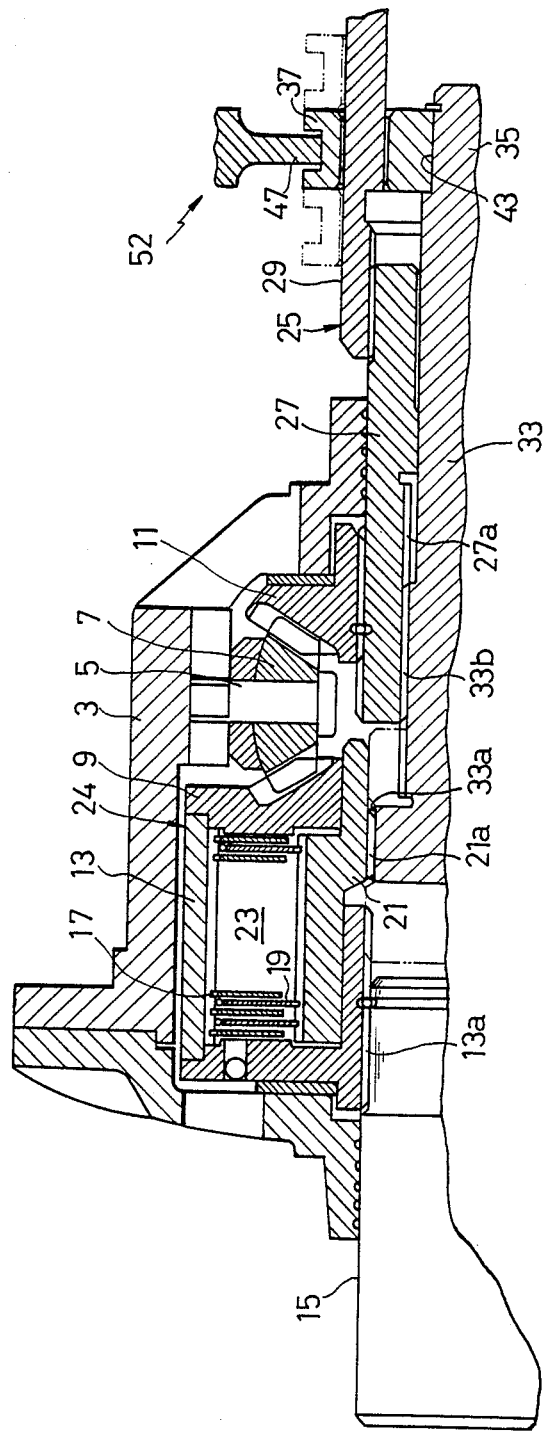

POWER TRANSMISSION APPARATUS

BACKGROUND OF THE INVENTION

1. Field of the Invention

The present invention relates generally to a power transmission apparatus, and more specifically to a power transmission apparatus of viscous coupling differential gear type suitable for use in an automotive vehicle.

2. Description of the Prior Art

A typical prior-art power transmission apparatus of viscous coupling differential type will be described hereinbelow with reference to FIG. 1. In the drawing, a power transmission apparatus 100 roughly comprises a differential gear casing 101 driven by an appropriate ring gear (not shown), a pinion gear 105 rotatably supported by a pinion shaft 103 fixed to the differential casing 101, a first side gear 109 in mesh with the pinion gear 105 and spline-engaged with a first output shaft 107, a second side gear 113 also in mesh with the pinion gear 105 and spline-engaged with a second output shaft 111.

In the case of an automotive vehicle, the first output shaft 107 is a rear left side wheel shaft, while the second output shaft 111 is a rear right side wheel shaft, for instance. Therefore, when the automotive vehicle travels along a straight road, the two first and second side gears 109 and 113 rotate at substantially the same speed without rotating the pinion gear 105. On the other hand, when the automotive vehicle travels along a curved road, the pinion gear 105 rotates about the shafts 107 or 111 rotational speed between the two output (wheel) shafts 107 and 111.

In addition, the power transmission apparatus 100 further comprises a viscous coupling device (VCD) 125 provided between the differential gear casing 101 and the first output shaft 107 to limit the differential operation between the two output shafts 107 and 111.

In more detail, an inner hub 115 is spline engaged with the first output shaft 107, and a number of first resistance plates 117 are spline engaged with the inner hub 115 at regular axial intervals. On the other hand, a coupling case 121 is fixed to the differential gear casing 101 with screws 121A, and a number of second resistance plates 119 are spline engaged with the coupling case 121 at regular axial intervals. Each of the first resistance plates 117 (fixed to the first output shaft 107) and each of the second resistance plates 119 (fixed to the differential gear casing 101) are arranged alternately within a closed working chamber 123 filled with a viscous fluid.

In the prior-art power transmission apparatus as described above, however, when a tire is punctured and therefore a spare (temper) tire (whose diameter is a little smaller than that of the ordinary tire) is replaced with the punctured tire an one wheel side or when tire inflating pressure is different from each other between both side wheels, a difference in rotational speed is kept produced for many hours between both the wheels. In this case, since the first output shaft 107 rotates at high speed relative to the differential gear casing 101, the viscous fluid within the working chamber 123 is always sheared off by a great number of the resistance plates 117 and 119. As a result, there exists a problem in that the viscous fluid is heated up to an abnormally high temperature and/or high pressure, so that the resistance plates 117 and 119 tend to seize and therefore it is impossible to obtain a smooth differential operation.

SUMMARY OF THE INVENTION

With these problems in mind, therefore, it in the primary object of the present invention to provide a power transmission apparatus of viscous coupling differential type, by which the viscous coupling device is allowed to be inoperative when a difference in rotational speed exists for many hours between the first and second output shafts.

To achieve the above-mentioned object, a power transmission apparatus for transmitting a rotational power to first and second output shafts via a differential gear composed of a differential gear casing (to which the rotational power is applied), a pinion gear, a first side gear and a second side gear formed in the second output shaft, according to the present invention, comprises: (a) viscous coupling means having a coupling case fixed to the first output shaft and in mesh with the first side gear; a plurality of first resistance plates fixed to an inner circumference of the coupling case at axial regular intervals; an inner hub disposed around the first output shaft rotatably relative to the coupling case; and a plurality of second resistance plates fixed to an outer circumference of the inner hub at axial regular intervals alternately with the first resistance plates, a working chamber filled with a viscous fluid being formed by the coupling case and the inner hub, (b) clutch means for selectively engaging the second output shaft to the inner hub to realize a viscous coupling limit slip differential mode and disengaging the second output shaft from the inner hub to realize a free differential mode; and (c) clutch drive means for selectively driving the clutch means;

In addition, the clutch means further comprises means for selectively disengaging the second output shaft from the inner hub and further directly engaging the second output shaft with the first output shaft to realize a differential lock mode.

In the apparatus according to the present invention, when there exists a difference in rotational speed between the two output shafts for many hours, since the inner hub is disengaged from the second output shaft by means of the clutch means, the coupling case and the inner hub rotate together therewith, so that it is possible to prevent viscous fluid from being heated abnormally high at temperature or in pressure for providing a reliable power transmission operation.

In addition, when the first and second output shafts are directly coupled to each other to disable differential gear motion of viscous coupling type, it is possible to allow the vehicle to travel more firmly or reliably on a muddy road.

BRIEF DESCRIPTION OF THE DRAWINGS

The features and advantages of the power transmission apparatus according to the present invention over the prior-art apparatus will be more clearly appreciated from the following description taken in conjunction with the accompanying drawings in which:

FIG. 5 is a half cross-sectional view showing a second embodiment of the power transmission apparatus of the present invention.

DETAILED DESCRIPTION OF THE PREFERRED EMBODIMENTS

A first embodiment of the power transmission apparatus of the present invention will be described in more detail hereinbelow with reference to the attached drawings.

The feature of the power transmission apparatus of the present invention is to comprise a clutch mechanism, by which an inner hub is engaged (viscous coupling limit slip differential mode) or disengaged (free or conventional differential mode) with or from a movable clutch shaft coupled to the second output shaft.

Figure 1:
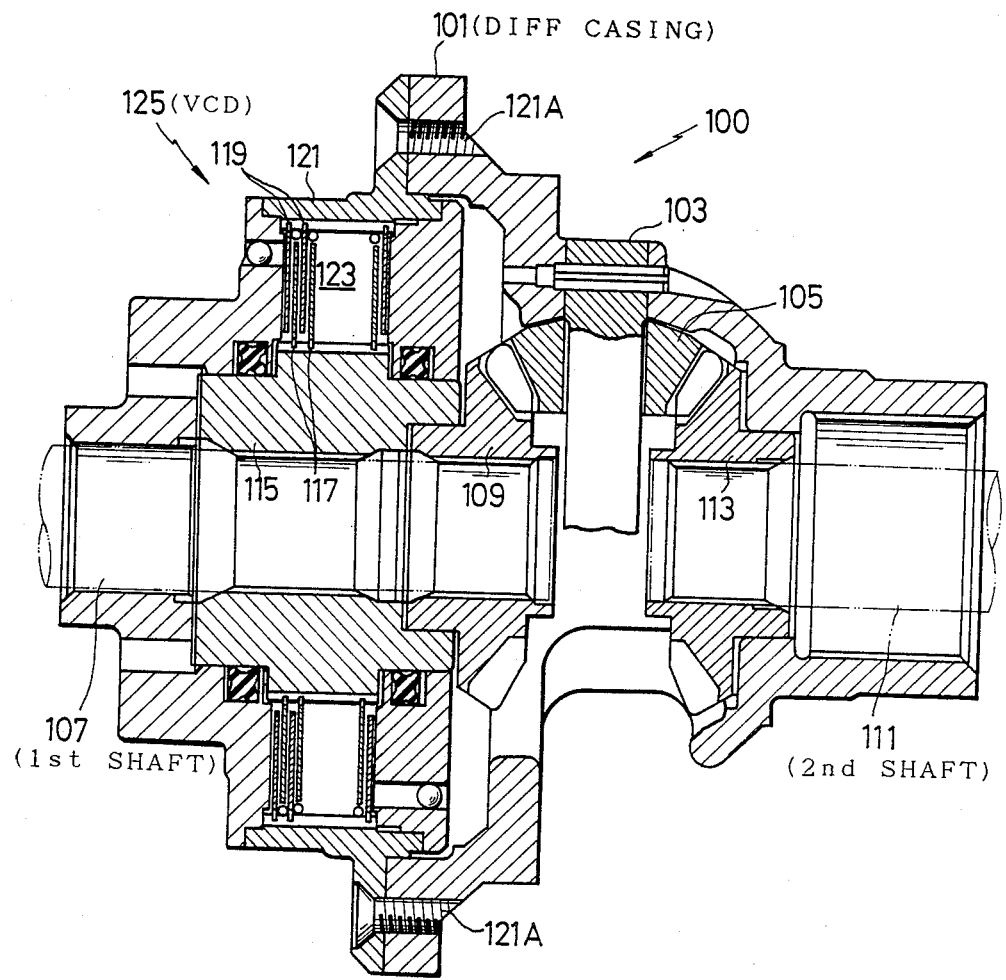
FIG. 1 is a cross-sectional view showing on example of prior-art power transmission apparatus.
Figure 2:
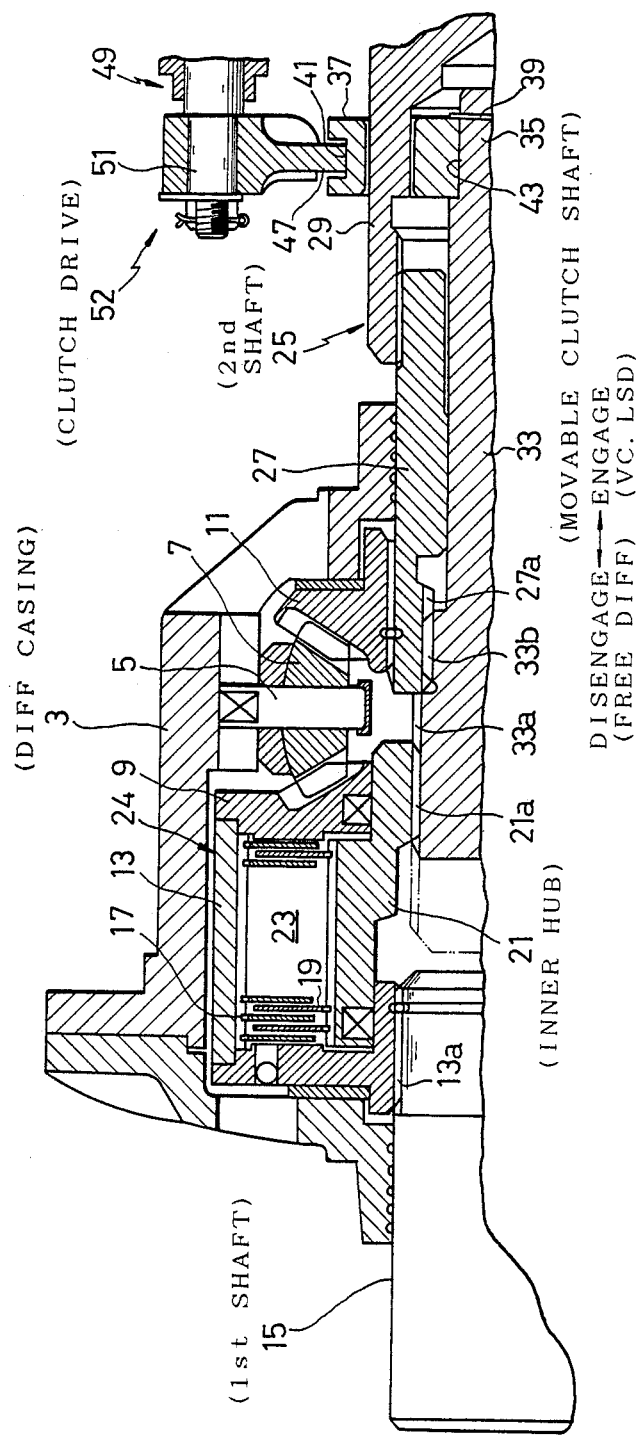
FIG. 2 is a half cross-sectional view showing a first embodiment of the power transmission apparatus of the present invention.

In FIG. 2, the power transmission apparatus comprises a differential gear casing 3 driven by an appropriate ring gear (not shown), a pinion gear 7 rotatably supported by a pinion shaft 5 fixed to the differential casing 3, a first side gear 9 being in mesh with the pinion gear 7 and a second side gear 11 also being in mesh with the pinion gear 7.

The first side gear 9 is fixed by welding to a coupling case 13 spline engaged with a first output shaft 15. A number of first resistance plates 17 are spline engaged with the coupling case 13 at axial regular intervals.

Further, an inner hub 21 is rotatably supported around the first output shaft 15. A number of second resistance plates 19 are spline engaged with the inner hub 21 at axial regular intervals. Each of the first resistance plates 17 (fixed to the coupling case 13 and each of the second resistance plates 19 fixed to the inner hub 21) are arranged alternately with each other within a closed working chamber 23 filled with a viscous fluid (e.g. silicon oil) to form a viscous coupling device 24.

The second output shaft 25 is composed of a hollow power transmission shaft 27 and a second rod output shaft 29 coupled to each other via splines formed in the outer circumference of the hollow shaft 27 and in the inner circumference of the rod shaft 29.

Figure 3A:
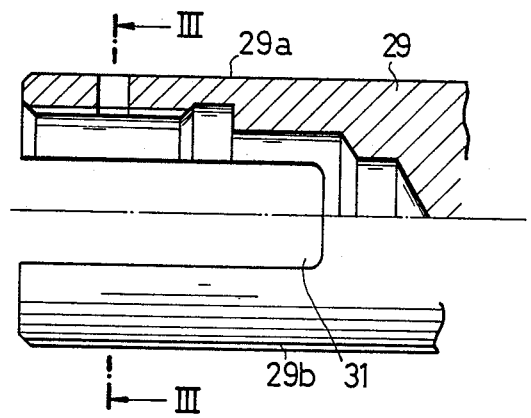
FIG. 3A is a partial longitudinal cross-sectional view showing only one end of a second output shaft.
Figure 3B:
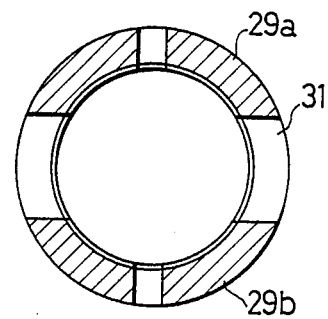
FIG. 3B is a cross-sectional view taken along the line III—III shown in FIG. 3A.

Further, the second side gear 11 is spline coupled with an outer circumference of the hollow power transmission shaft 27 (See FIG. 2). As depicted in FIGS. 3A and 3B, this second rod output shaft 29 is formed with a bored end portion at which two horizontal arcuate cutout portions 31 are formed as shown in FIG. 3B. In other words, the second rod output shaft 29 is formed with two arcuate projections 29a and 29b at one end thereof so as to be passed through two hollow portions 45 of a engage ring 37 and spline coupled to an outer circumference of the hollow power transmission shaft 27.

Further, an axially movable clutch shaft 33 is inserted into the hollow power transmission shaft 27 so as to be spline engaged with both this hollow power transmission shaft 27 and the inner hub 21. In more detail, the clutch shaft 33 is formed on the left side with large-diameter splines 33a engageable with inner splines 21a of the inner hub 21 and small diameter splines 33b engageable with inner splines 27a of the hollow power transmission shaft 27. Therefore, when this clutch shaft 33 is moved in the leftward direction as shown by dot-dot dashed lines in FIG. 2, although the large diameter splines 33a are kept engaged with the inner splines 21a of the inner hub 21, since the small diameter splines 33b are disengaged from the inner splines 27a of the hollow power transmission shaft 27, the apparatus operates as a free or conventional differential gear mode(FREE DIFF). On the other hand, when this clutch shafts 33 is moved in the rightward direction as shown by solid lines in FIG. 2, since the small diameter splines 33b are also engaged with the inner splines 27a of the hollow power transmission shaft 27 under the conditions that the large diameter splines 33a are kept engaged with the inner splines 21a of the inner hub 21, the apparatus operates as a viscous coupling limit slip differential gear mode(VC. LSD) in order to limit the differential operation between the two output shafts 15 and 25 (this VC. LSD operation is effective in case the vehicle travels muddy road, because it is necessary to limit the speed difference between two side wheels.)

Figure 4A:
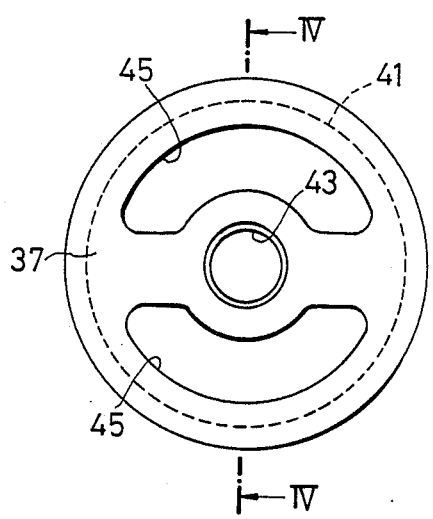
FIG. 4A is a front view showing a clutch shaft engage (drive) ring engaged with the clutch shaft incorporated in the apparatus shown in FIG. 2.
Figure 4B:
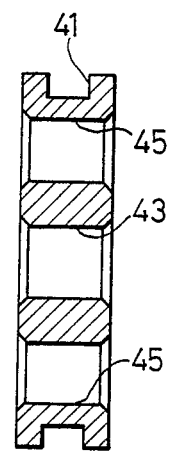
FIG. 4B is a cross-sectional views taken along the line IV—IV in FIG. 4A.

On the other hand, the clutch shaft 33 is formed on the right side with a small diameter portion 35 to which the engage ring 37 is rotatable fitted and axially fixed with a snap ring 39. As depicted in FIGS. 4A and 4B, the engage ring 37 is formed with a central hole 43 to which the right side small diameter portion 35 of the clutch shaft 33 is passed, a pair of arcuate hollow portions 45 to which the two arcuate projections 29a and 29b of the second rod output shaft 29 are passed, and an outer circumferential recess (groove) 41 to which a fork member 47 of a clutch drive 52 (described later) is engaged.

A clutch drive 52 comprises a fork member 47, a drive shaft 51 for supporting the fork member 47, and a clutch drive actuator 49 for driving the drive shaft 51 in the leftward or rightward directions. The clutch drive actuator 49 is of vacuum, hydranlic or motor type, etc. actuatable manually or automatically according to the presence or possibility of a difference in speed between the two output shafts 15 and 25.

The operation of the above-mentioned first embodiment will be discussed, hereinbelow.

When either one of tires is punctured, the punctured tire is replaced with a spare (i.e. temper) tire mounted on the vehicle. However, since the diameter of the spare tire is usually smaller than the ordinary tire, there inevitably exists a difference in rotational speed between the spare tire and the ordinary tire.

In this case, wherer the inner hub 21 is coupled to the second output shaft 25 via the movable clutch shaft 33, and the hollow power transmission shaft 27, since the apparatus operates as viscous coupling limit slip differential gear mode, there exists a difference in rotational speed between the coupling casing 13 rotated together with the first output shaft 15 fixed to the spare tire, for instance and the inner hub 21 rotated together with the clutch shaft 33 and the second output shaft 25 fixed to the ordinary tire. Therefore, the viscous fluid within the working chamber 23 is always sheared off by a number of the first and second resistance plates 17 and 19, so that temperature and/or pressure of the viscous coupling rises abnormally high.

To present the above-mentioned problem, whenever an ordinary tire is replaced with a temper tire, the clutch drive actuator 49 is actuated to disengage the movable clutch shaft 33 from the hollow power transmission shaft 27 or the second output shaft 25. In more detail, whenever a temper tire is fixed to one of the output shafts 15 and 25, the presence of the temper tire is detected automatically or manually to drive the clutch drive 52 to the leftward direction in FIG. 2. That is, the fork member 47 moves the movable clutch shaft 33 in the leftward direction (in the disengage direction) via the engage ring 37, so that the clutch shaft 33 is separated from the hollow power transmission shaft 27 or the second output shaft 25 to allow the apparatus to operate in free differential mode. In this mode, although the inner hub 21 is still spline engaged with the movable clutch shaft 33 via the splines 21a and the splines 33a, since the clutch shaft 33 is disengaged from the hollow power transmission shaft 27 via the splines 33a and the splines 27a, even if there exists a difference in rotational speed between the two first and second output shafts 15 and 25, the coupling case 13 and the inner hub 21 or the two first and second resistance plates 17 and 19 rotate together without shearing off the viscous fluid within the operating chamber 23, thus it being possible to prevent viscous fluid temperature from increasing to an abnormally high value. In other words, the vehicle can travel stably even after the temper tire has been attached.

FIG. 5 shows a second embodiment of the power transmission apparatus of the present invention, in which differential lock mode (two output shafts 15 and 25 are directly connected to each other) is additionally provided.

In more detail, being different from the first embodiment shown in FIG. 2, the inner splines 13a of the coupling case 13 extend in the rightward direction away from the right side end of the first output shaft 15, the inner splines 21a of the inner hub 21 are partially cut away on the right side, and the splines 33a of the movable clutch shaft 33 are short and other splines 33b thereof are long.

Therefore, when the movable clutch shaft 33 is moved to the leftmost position as shown by dot-dot dashed lines in FIG. 5, since the short splines 33a of the clutch shaft 33 are engaged with those 13a of the coupling case 13 and further the long splines 33b of the clutch shaft 33 are still engaged with the splines 27a of the hollow power transmission shaft 27 fixed to the second output shaft 25, these two first and second output shafts 15 and 25 are directly coupled in differential gear lock mode(DIFF LOCK), without being subjected to the influence of the presence of the viscous coupling device 24 and the differential gear. Further, in this differential lock mode, since the two output shafts 15 and 25 (i.e. two right and left side wheels) can be rotated together, it is possible to perfectly limit the differential rotation between the two wheels. In other words, it is possible to drive the vehicle more reliably on muddy road.

Further, when the movable clutch shaft 33 is moved to the intermediate position as shown by solid lines in FIG. 5, since the short splines 33a of the clutch shaft 33 are engaged with the inner splines 21a of the inner hub 21 and further the long splines 33b of the clutch shaft 33 are kept engaged with the splines 27a of the hollow power transmission shaft 27 fixed to the second output shaft 25, these two first and second output shafts 15 and 25 are coupled in the viscous coupling limit slip differential (VC. LSD) mode in order to limit the differential operation between the two output shafts 15 and 25 by means of the viscous coupling device 24.

Further, when the movable clutch shaft 33 is moved to the rightmost position as shown by dot-dashed lines in FIG. 5, since the short splines 33a of the clutch shaft 33 are disengaged from the inner splines 21a of the inner hub 21 (although the long splines 33b of the clutch shaft 33 are kept engaged with the splines 27a of the hollow power transmission shaft 27 fixed to the second output shaft 25), these two first and second output shafts 15 and 25 are coupled in the free differential mode(FREE DIFF). Further, in this free differential mode, a power transmitted to the differential case 3 is transmitted to the first output shaft 15 by way of the pinion shaft 5, the pinion gear 7, the side gear 9 and the coupling case 13; on the other hand, to the second output shaft 25 by way of the pinion shaft 5, the pinion gear 7, the side gear 11, and the hollow power transmission shaft 27, and the second rod output shaft 29, without being subjected to the influence of the viscous coupling 24.

Further, in the above second embodiment, it should be noted that the order of three, differential lock, viscous coupling limit slip differential and free differential, modes is very important from standpoint of synchronization, because the viscous coupling device 24 serves as a synchronizing mechanism while the vehicle is travelling.

In this second embodiment, the above-mentioned three mode positions can be obtained by actuating the clutch drive mechanism 52 manually or automatically by means of appropriate means for detecting vehicle wheel rotating conditions.

As described above, in the power transmission apparatus according to the present invention, the apparatus can be operated in three, differential lock (DIFF LOCK), viscous coupling limit slip differential (VC. LSD), and free differential (FREE DIFF) modes by means of clutch shaft. That is, since the inner hub 21 is decoupled from the second output shaft 25 in FREE DIFF mode, when there always exists a big difference in rotational speed between the two output shafts, it is possible to allow the viscous coupling to be inoperative to prevent the viscous coupling device at normal or regular temperature and pressure. In addition, since the two output shafts can be directly coupled in DIFF LOCK mode, it is possible to further improve or emphasize the differential limit slip operation when the vehicle is travelling on muddy road.

What is claimed is:

1. A power transmission apparatus for transmitting a rotational power to a first output shaft and a second output shaft via a differential gear composed of a differential gear casing to which the rotational power is applied, a pinion gear rotatably supported by the differential gear casing, a first side gear in mesh with the pinion gear and a second side gear formed in the second output shaft and in mesh with the pinion gear, which comprises;
   (a) viscous coupling means including:
      (1) a coupling case fixed to the first output shaft and in mesh with the first side gear;
      (2) a plurality of first resistance plates fixed to an inner circumference of said coupling case at axial regular intervals;
      (3) an inner hub disposed around said first output shaft rotatably relative to said coupling case; and
      (4) a plurality of second resistance plates fixed to an outer circumference of said inner hub at axial regular intervals alternately with said first resistance plates, a working chamber filled with a viscous fluid being formed by said coupling case and said inner hub;

(b) clutch means for selectively engaging the second output shaft to said inner hub to realize a viscous coupling limit slip differential mode and disengaging the second output shaft from said inner hub to realize a free differential mode; and (c) clutch drive means for selectively driving said clutch means.

2. The power transmission apparatus of claim 1, wherein said clutch means further comprises means for selectively disengaging the second output shaft from said inner hub and further directly engaging the second output shaft with the first output shaft to realize a differential lock mode.

3. A power transmission apparatus for transmitting a differential power to first and second output shafts comprising:

(a) a differential casing to which a rotational power is applied;

(b) a pinion gear rotatably supported by said differential casing;

(c) a first side gear in mesh with said pinion gear;

(d) a second side gear formed in the second output shaft and in mesh with said pinion gear;

(e) a coupling case fixed to said first side gear and rotated together with the first output shaft;

(f) a plurality of first resistance plates fixed to an inner circumference of said coupling case at regular axial intervals;

(g) an inner hub disposed around said first output shaft rotatably relative to said coupling case;

(h) a plurality of second resistance plates fixed to an outer circumference of said inner hub at regular axial intervals alternately with said first resistance plates, a working chamber filled with a viscous fluid being formed by said coupling case and said inner hub;

(i) a movable clutch shaft for selectively spline engaging the second output shaft to said inner hub to realize a viscous coupling limit slip differential mode and spline disengaging the second output shaft from said inner hub to realize a free differential mode; and (j) a clutch drive mechanism for selectively moving said movable clutch shaft.

4. The power transmission apparatus of claim 3, wherein said movable clutch shaft further comprises means for selectively spline disengaging said second output shaft from said inner hub and directly engaging said second output shaft with said first output shaft to realize a differential lock mode.

5. The power transmission apparatus of claim 3, which further comprises a clutch drive mechanism having:

(a) an engage ring coupled to said movable clutch shaft;

(b) a fork member coupled to said engage ring; and (c) a drive unit for driving said movable clutch shaft.

* * * * *